Patented July 18, 1950

2,515,276

UNITED STATES PATENT OFFICE 2,515,276

METHOD OF MAKING A FOAM-PRODUCING COMPOSITION

Clement K. Swift, Narberth, Pa., assignor to MacAndrews and Forbes Company, Camden, N. J., a corporation of New Jersey No Drawing. Application May 28, 1948, Serial No. 29,925

18 Claims. (Cl. 252—8.05)

The present invention relates to a novel process for the preparation of foam-producing compositions especially suitable for the generation of highly stable and fire-resistant fire extinguishing foam, and more particularly it relates to a novel step or steps in the preparation of mechanical- or air-foam-producing compositions from proteinaceous material. The present application is a continuation-in-part of application Serial No. 650,761, now abandoned, filed February 27, 1946.

The production of a commercially practicable air foam has been the aim of investigators for many years, and various types of foam-producing materials have been the subject of intensive study in this country and abroad during the past decade. It has been found that products resulting from the partial hydrolysis of certain proteins produce foams whose stability can be substantially improved by the addition of water-soluble salts of metals such as iron, aluminum, or chromium where such metallic ions are compatible with the particular protein used. In fact, these metal-fortified protein products have been found to be so superior to the materials originally used that present day foam-generating devices are designed specifically for use with such protein products.

Numerous proteinaceous materials have been used or suggested for use in the preparation of air foam compositions, such as those found in horns, hoofs, hair, blood, and the various meals and flours, for instance soya bean meal, pea flour, and corn meal. In the preparation of foam-producing compositions from such proteinaceous materials, they are first subjected to a controlled hydrolyzation treatment whereby the nitrogen present in the water-soluble products is in the form of degradation products of the original protein base material. The hydrolysis treatment generally consists in heating the proteinaceous material in an aqueous medium and in the presence of a hydrolyzing agent until the desired degree of hydrolysis or degradation has been attained. The hydrolyzing agent most generally employed is lime, although other alkaline earth hydroxides such as barium and strontium may be used if desired. After the partial hydrolysis of the protein has been obtained, the product is generally neutralized to provide a product having a pH within the neutral range, i. e. between about 6.5 and about 8. In the procedures heretofore employed, an acid was added to lower the pH, and since it is desirable to free the product substantially of the calcium present, it was generally preferred to add sulphuric acid in order to form substantially insoluble calcium or other alkaline earth sulphate.

The use of acids, and especially of strong acids such as sulphuric acid, gives rise to many complications. In the first place, such acidic material, when added to the partially hydrolyzed solution of proteinaceous material, causes local isoelectric precipitation of nitrogenous matter which is very difficultly soluble in the solution. Furthermore, since the pH of the neutralized product is quite critical, there is danger of not reaching the proper end point by the addition of the strong acid, and if too much acid is added, the entire mass may be converted to insoluble matter, the recovery of which is difficult, expensive and time-consuming. Thus, complicated proportioning equipment is required. Moreover, the use of sulphuric acid gives rise to difficulties in handling and danger of injury to the operators as well as necessitating expensive non-corrosive equipment.

It is therefore, an object of the present invention to provide a novel procedure for the preparation of foam-producing compositions from proteinaceous material wherein the difficulties hereinabove mentioned are not encountered.

Another object is to provide a method for the preparation of foam-producing compositions from proteinaceous material wherein no danger of precipitation of part or all of the proteinaceous material is encountered.

A specific object is to provide a novel method for neutralizing the partially hydrolyzed lime-containing proteinaceous material in the preparation of foam-producing compositions therefrom.

A further object of the invention is to provide a method by which a foam-producing material of advantageous properties may be prepared, which foam-producing material may be used in conjunction with the various types of water, including sea water, and air or other gas in the production of a mechanical foam characterized by high stability, a high degree of fire-resistance, and sufficient mobility and adhesiveness so that it will flow readily over the surfaces of burning liquids and will cling to relatively smooth vertical surfaces.

Further objects will become apparent from a consideration of the following specification and the claims.

As stated, the present invention deals with the preparation of foam-producing agents, and especially foam-producing agents suitable for the generation of fire-extinguishing foam, by the partial hydrolysis of proteinaceous material using an alkaline earth hydroxide, preferably lime, as the hydrolyzing agent. Since it has been found that the maize endosperm protein, zein, is especially advantageous for the preparation of foam-producing compositions, as will hereinafter appear, the present invention will be described with special emphasis on the use of zein or zein-containing material as the proteinaceous material. However, it will be understood that the present process is equally applicable when other proteinaceous materials such as keratins, albumens, globulins or hemoglobins, or mixtures thereof are employed. If desired, a water-soluble metal salt stabilizing agent, a freezing point depressant, and/or a preservative may be included in the composition.

In accordance with the present invention, the excess alkalinity of the alkaline solution of proteinaceous material which has been partially hydrolyzed by heat and in the presence of an alkaline earth hydroxide, preferably lime, is neutralized by the use of water-soluble material which furnishes ammonium ions and which furnishes anions capable of forming a substantially water-insoluble salt with the alkaline earth cations selected from the group consisting of oxalate, tartrate, sulphate, sulphite, carbonate, bisulphite and bicarbonate.

By the process therefore, both neutralization and the removal of the alkaline earth compound from the solution are provided. The most expedient method of providing both ammonium ions and anions capable of forming a substantially water-insoluble salt with the alkaline earth cations is by the use of an ammonium salt, the anion of which is as stated above. However it will be seen that, if for any reason it is desired, the ammonium ions may be provided by one salt and the anions capable of forming the substantially water-insoluble alkaline earth metal salt by another. Thus herein, and in the claims where reference is made to water-soluble material which furnishes ammonium ions and which furnishes anions selected from the stated group, it is understood to include a combination of salts, one of which furnishes the ammonium ions and another of which furnishes the anions of the type described, as well as ammonium salts, the anions of which are of the type described. In any event, neutralization results from the reaction between the ammonium salt and the hydroxyl ions of the hydrolysate solution to form ammonia in solution and the subsequent removal of the ammonia by heat. Since however, it is preferred to provide the ammonium ions and the anions capable of forming the substantially water-insoluble salt with the alkaline earth metal cations, by the use of one salt, the invention will be described with emphasis on the use of such an ammonium salt.

Obviously, two or more of the ammonium salts may be employed if desired. The insoluble alkaline earth salt formed is removed from the solution at an appropriate step in the process before, during, or after the concentration of the hydrolysate.

While any ammonium salt which furnishes an anion capable of forming a substantially water-insoluble salt with the alkaline earth cation may be employed, the use of an ammonium carbonate (ammonium carbonate or ammonium bicarbonate) is preferred. Such a salt not only affords practically complete removal of the alkaline earth ions from the solution, but also contains an unstable anion in the sense that any excess which is in solution will break down under the influence of heat to release carbon dioxide. Hence, when ammonium carbonate is employed, no extraneous ions will be found in the hydrolysate, even when the salt is used in excess of that required because upon heating, both ammonia and carbon dioxide will be liberated from the solution. Ammonium bicarbonate is employed in the preferred embodiment of the invention since its greater heat-stability in solution as compared to the carbonate, makes it more efficient to use and its univalent anion possesses only about one-fourth the local salting out effect on the partially hydrolyzed protein as does the bivalent carbonate ion.

It is for this same reason that the other ammonium salts containing a univalent anion are usually preferred to those containing a bivalent anion and that those containing a bivalent anion are preferred to those containing a trivalent anion, the local salting out effect increasing to about nine times with the trivalent anion (such as $PO_4\equiv$) as compared to the effect of a univalent union. While ammonium oxalate and sulphite produce a calcium salt which is less soluble than the sulphate, they must be added in substantially stoichiometric amounts if a metal salt stabilizing agent is to be employed, the cation of which would be precipitated as the insoluble metal salt of the anion, and hence as between the first-named ammonium salts and the sulphate, the use of the sulphate is oftentimes preferred.

The amount of ammonium salt employed as the neutralizing agent is of course, sufficient at least to combine with substantially all of the alkaline earth ions present and to provide a product in the neutral range, for example having a pH between about 6.5 and about 8. An amount of neutralizing agent moderately in excess of that required for reaction with the alkaline earth ions, while not deleterious from the standpoint of excess acidity, does not offer any compensating advantages. In fact, it has been found that when an excessive amount of the ammonium salt is employed, there is a tendency for a local "salting out" effect on the partially hydrolyzed protein and, as indicated above, the extent of this salting out effect is directly proportional to the square of the valence value of the anion. Furthermore, as also stated, when a metal salt stabilizing agent is to be included in the product, the ammonium salt, if its anion forms an insoluble salt with the cation of the metal salt, should be added in substantially stoichiometric amounts. The ammonium salt may be added to the hydrolysate in solid form or in the form of an aqueous solution. For convenience to the operator, the latter method is generally preferred.

The ammonium salt may be added to the hot hydrolysate prior to the concentration thereof, and the insoluble salt removed from the product after concentration to the desired extent. In this procedure, the heat supplied to evaporate the excess water, liberates the ammonia from the solution and if the alkaline earth salt first formed is soluble, it is converted to the insoluble form. However, so long as sufficient heat is supplied for the aforesaid purpose or purposes, the ammonium salt may be added to the hydrolysate any time during or after concentration. For example, concentration of the mixture may be carried out simultaneously with hydrolyzation. In such a case, after the proteinaceous material has been hydrolyzed to the desired degree and partial or complete concentration of the solution has been achieved, the neutralizing agent may be added, followed by heating for the purpose or purposes mentioned as well as to complete the concentration if necessary. At any rate, the order of the addition of the ammonium salt with heating, and concentration, may be varied as desired as long as the partially hydrolyzed proteinaceous product obtained possesses the desired viscosity characteristics.

The insoluble alkaline earth metal salt may be removed either before or during concentration, depending of course, upon when the ammonium salt has been added. Normally, the ammonium salt is added prior to concentration, and thus the insoluble calcium salt may be removed subsequently before appreciable concentration has been achieved or after substantial concentration. Depending upon the particular ammonium salt employed and the alkaline earth ions in solution, either procedure may be advantageous. For example, if a highly insoluble calcium salt such as the carbonate, oxalate, and the like is formed, removal of the calcium salt prior to concentration is an advantageous expedient in that it is preferred to concentrate a clear solution. On the other hand, if there is formed a salt which is slightly more soluble in dilute concentrations than those calcium salts mentioned above, such as for example, calcium sulphate, it may be advantageous to concentrate the hydrolysate first to insure more nearly complete precipitation of the calcium salt. Moreover, when an acid salt is employed, in which case heat is relied upon to insure the precipitation of a substantially water-insoluble calcium salt, it may be desirable to concentrate the solution to some extent at least before the removal of the alkaline earth salt.

What has been said above applies equally as well to the use of a combination of salts, one of which supplies the ammonium ions, and another of which supplies the anions of the type described, for instance the sodium or potassium salts corresponding to the ammonium salt hereinabove set forth. For example, the use of a soluble carbonate, for instance sodium carbonate or sodium bicarbonate with an ammonium salt such as ammonium chloride will afford the same result. However, in this case there will always be a residual salt remaining in solution (in the illustration given, sodium chloride). It is for this reason that the use of ammonium salts which furnish the desired anions is preferred.

In following any of the above procedures, the insoluble alkaline earth salt may be readily removed from the solution by filtration, centrifuging, or settling and decantation.

By the use of the material which furnishes ammonium ions and anions of the type described and especially the ammonium salt as herein described, an efficient control of the reduction of the alkalinity of the partially hydrolyzed proteinaceous material to the desired pH, for example to a pH of between about 6.5 and about 8, is provided.

When an ammonium carbonate is employed, any excess will be removed by heating the hydrolysate to free it from ammonia and carbon dioxide. When an ammonium salt containing an anion which does not decompose upon heating is the one selected, any excess of the salt over that required for the purposes described will remain as such in the hydrolysate. Since ammonia is only released readily from an alkaline solution, once the pH of the hydrolysate is reduced to the neutral range, no substantial amounts of ammonia will be further released and the hydrolysate will not become more acid. Thus the problems involved in the use of a free acid are not present in the process of the invention and no danger of precipitation of the partially hydrolyzed proteinaceous material in solution is encountered. Moreover, by the use of the ammonium salt, danger to the operator is eliminated; proportioning equipment need not be expensive or complicated; and the equipment need not be of special acid-resistant material. In addition, in accordance with the preferred procedure in which an ammonium carbonate is employed, no extraneous material will remain in the product even if the ammonium salt is used in excess. Furthermore, in view of the fact that the ammonium salt employed will convert the alkaline earth ions in the hydrolysate into a substantially insoluble salt which is removed from the product, a product is provided in which no sediment is deposited in the end product under normal storage conditions.

In order to increase the stability of the foam produced by the product, a stabilizing ingredient in the form of a water-soluble metal salt such as an iron, aluminum, or chromium salt is advantageously used and of the salts available, ferrous sulphate is preferred. The amount of water-soluble metal salt added will generally be between 1.0% and 5.0% based on the weight of the finished product.

In most cases, a freezing point depressant is added to permit storage of the product at temperatures as low as 15° F. to 20° F. without freezing. Suitable freezing point depressants are ethylene glycol, urea or glycerol, and the amount employed will depend on the desired reduction in freezing point and the particular freezing point depressant employed. In general, there will be added about 5% to 15% of freezing point depressant based on the weight of the finished material.

Because of the susceptibility of the hydrolyzed protein to putrefaction, a preservative such as sodium silico-fluoride or the salt of an organic quaternary base is added to the product. In general, the amount of preservative will be about 0.1% of the weight of the finished foam-producing composition.

The concentration of the hydrolysate may be accomplished by evaporation by boiling at atmospheric pressure or under vacuum and the amount of concentration required will depend on the proportion of water employed in the hydrolysis and the amount and type of the freezing point depressant and metal salt subsequently to be added, if any.

When zein or zein-containing material is employed as the proteinaceous material hydrolyzed in the process, an air-foam-producing material which possesses many advantageous properties is obtained. For example, excellent foam may be prepared from the product using various types of water, including sea water, and air or other gas. The foam produced is characterized by high stability, a high degree of fire-resistance, and a sufficient mobility and adhesiveness so that it flows readily over the surface of burning liquids and will cling to relatively vertical surfaces. Because of the advantages of using zein or zein-containing material and because lime is the alkaline earth hydroxide preferred for use, the specific procedure hereinafter described, will be directed to the use of these materials. It is to be understood however, that as previously stated, other proteinaceous material and other alkaline earth hydroxides may be used if desired.

While pure zein is an ideal material for the preparation of air-foam-producing compositions, it is relatively expensive and in practice the use of a less highly purified form of the maize endosperm protein is usually preferred for economic reasons. In the manufacture of corn starch, zein is concentrated in the gluten fraction by the usual process of wet classification. The corn gluten thus separated contains 50% or more of protein (of which about 70% is zein) the balance being starch, oil, fibre, and ash. Zein is prepared from such gluten by a solvent extraction process such as is described in "Industrial and Engineering Chemistry," vol. 33, No. 3, page 394 (1941).

Although corn gluten as it is separated from the starch is quite rich in zein, it still contains relatively large amounts of oil and starch, both of which are detrimental to the preparation of the most satisfactory air-foam composition. The starch associated with the gluten is readily removed by well known processes in use by grain technologists, and such a starch-free gluten is a product of commerce. For example, such a starch-free gluten is manufactured and sold by Corn Products Refining Company under the trade designation "Corn Protein No. 3320." The commercial products are dry powdered materials containing about 70% of total protein and a substantial amount of oil, for instance, 10% to 11%, the balance being fibre, ash, moisture, etc. Such starch-free gluten, the protein content of which is chiefly zein, preferably serves as the basis for the foam composition prepared in accordance with the present invention.

The oil content of the above described zein base material would, as stated, be very detrimental in the finished product and may be removed by solvent treatment or by solution of the protein followed by iso-electric precipitation. Both of these procedures are costly and laborious however, but by the use of lime as the hydrolyzing agent, the oil is completely removed during the hydrolysis of the protein due to the formation of insoluble calcium soaps.

When substantially starch-free, zein-containing material with which oil is associated is heated under pressure (for example 10 to 40 or more pounds per square inch) if desired, with a hot aqueous suspension of lime (such as milk of lime), the oil is simultaneously saponified to form a water-insoluble soap and a partial hydrolysis of the zein protein is accomplished. The amount of lime used must be sufficient to saponify all of the oil that may be present to insoluble calcium soaps, and to maintain a pH on the alkaline side of neutrality during the period of hydrolysis. For example, in the operation of the process, it is desirable to use sufficient lime so that a sample taken from the reaction mass toward the end of the reaction and cooled to room temperature will have a pH between about 9.5 and about 11.5. Ordinarily the ratio of lime, calculated as quicklime, to zein-containing material should not be less than about 1 to 10 and, while the ratio may be increased substantially, for example to 1 to 6.5, the amount of undissolved residual lime which must be removed by filtration increases as the ratio increases, and no compensating advantages result.

After the desired saponification and hydrolysis reactions have taken place, the reaction mixture may be filtered while still hot, and the alkaline filtrate is treated with the ammonium salt neutralizing agent of the type and in the amount hereinbefore discussed. The filtration of the hydrolysate before adding the ammonium salt neutralizing agent is sometimes advantageous because the insoluble calcium soaps and any lime not taken into solution during the hydrolysis are removed, facilitating the subsequent treatment of the product. However, if desired, the insoluble calcium soaps and any lime may be removed from the solution after neutralization and even at the same time that the insoluble calcium salts are removed. The fact that the glycerine remains in the solution is not important and the product is "oil-free" in the sense described herein. The oil-free hydrolysate containing the neutralizing agent is then concentrated by boiling to the desired consistency, at which stage the pH of a sample cooled to room temperature should generally be within the range of about 6.5 to about 8.0. The metal salt stabilizing agent, the freezing point depressant, and the preservative (if they are to be included) are advantageously added and the resulting product filtered while still hot.

The hydrolysis treatment ordinarily requires from four to six hours boiling at atmospheric pressure, the actual time being established experimentally to give the desired relation between specific gravity and viscosity in the neutralized and concentrated hydrolysate. Ordinarily, the conditions of hydrolysis are so regulated that the concentrate, before the addition of the metal salt stabilizer, freezing point depressant, or preservative (if added) will have a viscosity corresponding to about 20 to 70, preferably to 35 to 45 centipoises at a specific gravity of 1.13, both measurements being made at a temperature of 70° F. It is to be understood of course, that the specific gravity may be somewhat greater or less than 1.13 and that the viscosity figures will vary accordingly. It is however, possible to ascertain whether the viscosity corresponds to the range given above for a specific gravity of 1.13. It is to be also understood that while the figures given above are for a solution containing the hydrolysate and water and any glycerine resulting from the saponification of the oil, other materials may be present in the concentrate either due to their addition in the hydrolyzation step or to the concentrate and in such event, the specific gravity must be corrected accordingly in order to determine whether the concentrate has a viscosity within the range recited. Once having established the conditions of hydrolysis with respect to time, temperature, and proportions of ingredients to give the desired relation of specific gravity to viscosity, no deviation from the established procedure is necessary for successive batches processed. The following experimental data taken for one set of conditions will indicate how the time of hydrolysis influences the viscosity of the neutralized hydrolysate which has been concentrated to a specific gravity of 1.13 at 70° F.:

| Time of Hydrolysis (Hours) | Viscosity in Centipoises at 70° F. |
|---|---|
| 1 | 164.8 |
| 3 | 65.6 |
| 4 | 50.3 |
| 5 | 42.5 |
| 6 | 39.3 |

The following examples will serve to illustrate further the process of the invention:

Example 1

A suspension of 300 pounds of starch-free corn gluten, for example, the product known as "Corn Products Corn Protein No. 3320," and 30 pounds of quicklime is made in 180 gallons of cold water. This mixture is heated to boiling in a steam-jacketed kettle provided with a suitable agitating device, and is maintained at the boiling point for five hours. The product is filtered immediately without cooling, and 20 pounds of ammonium sulphate in concentrated aqueous solution are added to the filtrate.

The hydrolysate containing the ammonium sulphate is concentrated by evaporation to a specific gravity of 1.13 (measured at 70° F.). To the hot concentrated solution are added 10.0 pounds of ferrous sulphate ($FeSO_4.7H_2O$) dissolved in 3 gallons of hot water, 6 gallons of ethylene glycol, and a half pound of sodium silicofluoride, and the resulting mixture is agitated at or near the boiling point until the ingredients are completely and uniformly mixed. The solution is then filtered while still hot to remove the precipitated calcium sulphate, cooled to room temperature, diluted (if necessary) to adjust the viscosity to approximately 40 centipoises at 70° F., and transferred to shipping containers. The product will have a pH value of about 7.

Example 2

A suspension of 300 pounds of starch-free corn gluten, such as that used in Example 1, and 30 pounds of quicklime is made in 180 gallons of cold water. This mixture is heated to boiling in a steam-jacketed kettle provided with a suitable agitating device, and is maintained at the boiling point for five hours. The product is filtered immediately without cooling, and 21.5 pounds of ammonium bicarbonate in concentrated aqueous solution is added to the filtrate.

The hydrolysate is then concentrated and further treated as in Example 1. In this case, calcium carbonate is removed by filtration and the product will have a pH value of about 7.

Example 3

The above described procedure is followed for all details except that 50 pounds of urea is substituted for the 6 gallons of ethylene glycol used in Example 1.

Considerable modification is possible in the methods of producing the foam-producing compositions, as well as in the selection of the proteinaceous material and the ammonium salt, without departing from the essential features of the invention.

I claim:

1. In the method of preparing an air-foam-producing composition by the partial hydrolysis of proteinaceous material by heat in an aqueous medium and in the presence of an alkaline earth hydroxide, the steps which comprise neutralizing in the presence of heat the excess alkalinity of said solution of partially hydrolyzed proteinaceous material by a water-soluble material furnishing ammonium ions and furnishing anions capable of forming a substantially water-insoluble salt with the alkaline earth metal in solution selected from the group consisting of oxalate, tartrate, sulphate, sulphite, carbonate, bisulphite and bicarbonate ions, in an amount, to convert substantially all of the alkaline earth metal in the solution into said insoluble salt; and removing the insoluble salt from the solution.

2. The method of claim 1, wherein the alkaline earth metal in the solution of partially hydrolyzed proteinaceous material is calcium and wherein said water-soluble material is an ammonium salt furnishing said anions.

3. The method of claim 2, wherein the ammonium salt is an ammonium carbonate.

4. The method of claim 2, wherein the ammonium salt is ammonium bicarbonate.

5. The method of claim 2, wherein the ammonium salt furnishes univalent anions.

6. The method of claim 2, wherein the ammonium salt is ammonium sulphate.

7. The method of preparing an air-foam-producing composition which comprises partially hydrolyzing a proteinaceous material in an aqueous medium by boiling in the presence of lime; neutralizing the resulting hot solution by a water-soluble material furnishing ammonium ions and furnishing anions capable of forming a substantially water-insoluble salt with the calcium in solution, selected from the group consisting of oxalate, tartrate, sulphate, sulphite, carbonate, bisulphite and bicarbonate ions, in an an amount sufficient to convert substantially all of the calcium in the solution into said insoluble salt; heating said solution and removing the insoluble calcium salt formed at a step in the process subsequent to the addition of the said material to the solution.

8. The process of claim 7, wherein the said water-soluble material is an ammonium salt, furnishing said anions capable of forming a substantially water-insoluble salt with the calcium in solution.

9. The process of claim 8, wherein the proteinaceous material is substantially starch-free zein-containing material; wherein the solution, after the addition of the ammonium salt, is heated to concentrate it, and wherein the insoluble calcium salt is removed from the solution prior to the concentration step.

10. The process of claim 8 wherein the proteinaceous material is substantially starch-free zein-containing material; wherein the solution, after the addition of the ammonium salt, is heated to concentrate it, and wherein the insoluble calcium salt is removed from the solution subsequent to the concentration step.

11. The process of claim 8, wherein the proteinaceous material is substantially starch-free zein-containing material; wherein the ammonium salt is an ammonium carbonate, and wherein the solution, after the addition of the ammonium salt, is heated to concentrate it.

12. The process of claim 8, wherein the proteinaceous material is substantially starch-free zein-containing material; wherein the ammonium salt is ammonium bicarbonate, and wherein the solution, after the addition of the ammonium salt, is heated to concentrate it.

13. The method of preparing an air-foam-producing composition which comprises partially hydrolyzing a substantially starch-free, oil containing corn gluten product containing at least about 70% of total protein, the major portion of which is zein, by boiling, in an aqueous medium, said corn gluten product in the presence of an alkaline earth hydroxide to form a partially hydrolyzed proteinaceous product and an insoluble soap of the alkaline earth metal and the fatty acid of the oil; filtering the insoluble material from the solution while it is still hot; neutralizing the resulting hot solution by an ammonium salt furnishing anions capable of forming a substantially water-insoluble salt with the calcium in solution, selected from the group consisting of oxalate, tartrate, sulphate, sulphite, carbonate, bisulphite and bicarbonate ions, in an amount to convert substantially all the calcium in the solution into said insoluble salt; concentrating said solution; and removing the insoluble calcium salt formed at a step in the process subsequent to the neutralization of the solution.

14. The process of claim 13, wherein the insoluble calcium salt is removed from the solution prior to the concentration step.

15. The process of claim 13, wherein the insoluble calcium salt is removed from the solution subsequent to the concentration step.

16. The process of claim 13, wherein the ammonium salt is an ammonium carbonate.

17. The process of claim 13, wherein the ammonium salt is ammonium bicarbonate.

18. The process of claim 13, wherein the ammonium salt is ammonium sulphate, and wherein the insoluble calcium salt is removed from the solution subsequent to the concentration step.

CLEMENT K. SWIFT.

REFERENCES CITED

The following references are of record in the file of this patent:

UNITED STATES PATENTS

| Number | Name | Date |
|---|---|---|
| 2,232,053 | Daimler | Feb. 18, 1941 |
| 2,324,951 | Ratzer | July 20, 1943 |
| 2,365,619 | Bagley et al. | Dec. 19, 1944 |
| 2,373,603 | Rust et al. | Apr. 10, 1945 |
| 2,413,667 | Urquhart | Dec. 31, 1946 |

Patent No. 2,515,276

Certificate of Correction

CLEMENT K. SWIFT

July 18, 1950

It is hereby certified that error appears in the printed specification of the above numbered patent requiring correction as follows:

Column 4, line 2, after the word "when" insert *an*; line 23, for "union" read *anion*; column 10, line 26, strike out "an" first occurrence; line 27, strike out "sufficient";

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*